United States Patent [19]
Vipperman

[11] Patent Number: 5,856,396
[45] Date of Patent: *Jan. 5, 1999

[54] RUBBER WHEELS SUITABLE FOR USE ON A PORTABLE VEHICLE ADHESIVE REMOVER

[75] Inventor: Howard Vipperman, Anaheim, Calif.

[73] Assignee: Fisher Tool Co., Inc., City of Industry, Calif.

[ * ] Notice: The term of this patent shall not extend beyond the expiration date of Pat. No. 5,624,990.

[21] Appl. No.: 848,034

[22] Filed: Apr. 28, 1997

Related U.S. Application Data

[63] Continuation of Ser. No. 733,879, Jul. 22, 1991, Pat. No. 5,624,990.

[51] Int. Cl.[6] .................................................... C08K 3/26
[52] U.S. Cl. ........................ 524/425; 524/426; 524/432; 524/444
[58] Field of Search .................................... 524/425, 426, 524/432, 444

[56] References Cited

U.S. PATENT DOCUMENTS

| | | | |
|---|---|---|---|
| 3,950,292 | 4/1976 | Cooper | 260/23.7 R |
| 4,130,535 | 12/1978 | Coran et al. | 260/33.6 Q |
| 4,133,932 | 1/1979 | Peck | 427/323 |
| 4,157,320 | 6/1979 | Yanker | 260/28.5 A |
| 4,182,702 | 1/1980 | Schwartz | 260/42.16 |
| 4,220,574 | 9/1980 | Perrone | 260/23.7 H |
| 4,377,655 | 3/1983 | Himes | 524/313 |
| 4,504,604 | 3/1985 | Pilkington et al. | 523/167 |
| 5,190,620 | 3/1993 | Winter | 156/344 |
| 5,259,914 | 11/1993 | Fisher | 156/584 |
| 5,624,990 | 4/1997 | Vipperman | 524/425 |

*Primary Examiner*—Edward J. Cain
*Attorney, Agent, or Firm*—Adduci, Mastriani & Schaumberg, L.L.P.

[57] ABSTRACT

The present invention is a method of manufacturing rubber wheels and composition therefor used on a portable vehicle adhesive remover for removing pinstripes, decals, side moldings and other items adhering to a vehicle without damaging the original paint of the vehicle.

12 Claims, 1 Drawing Sheet

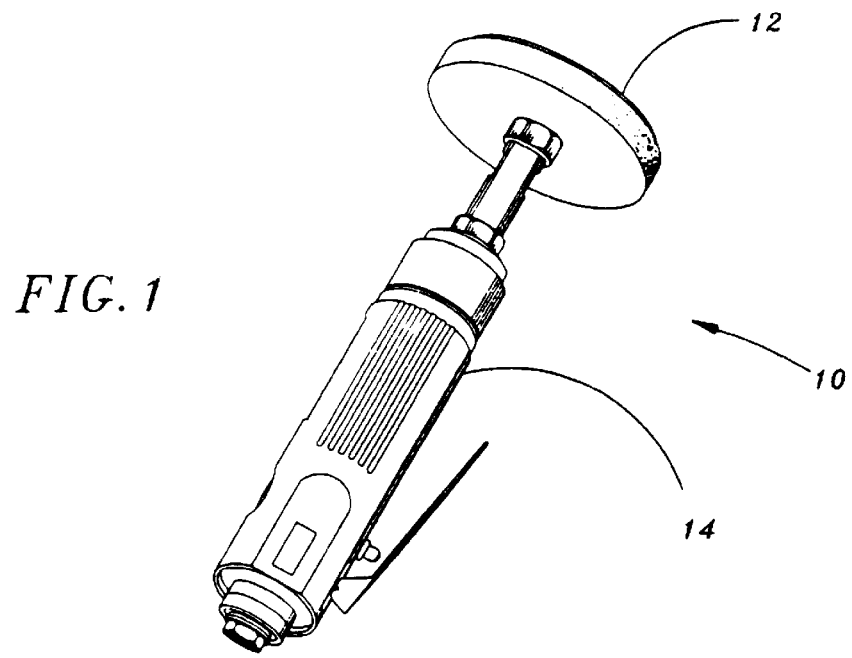
FIG. 1
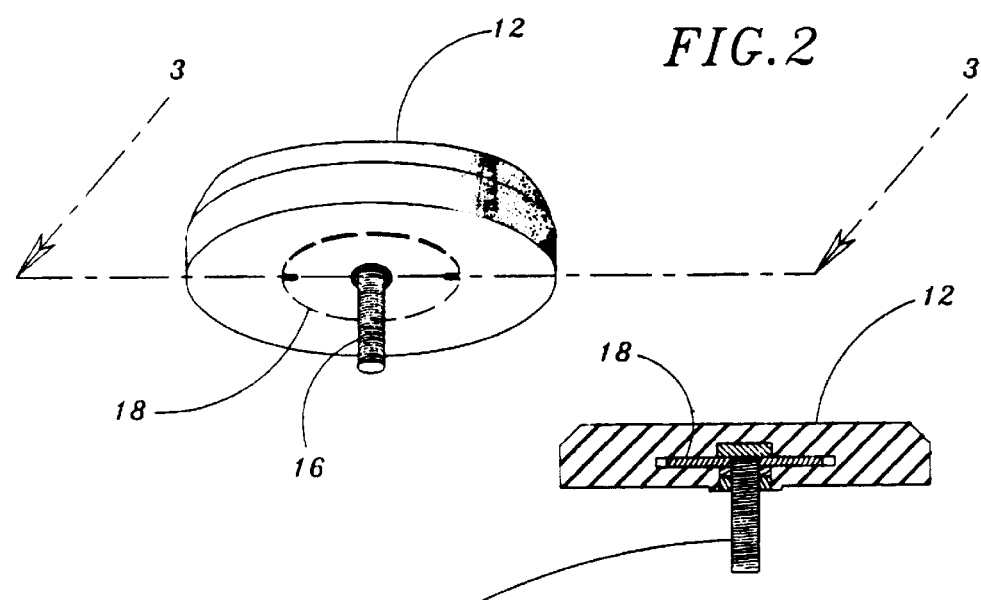
FIG. 2
FIG. 3
(Section on line 3 - 3)

RUBBER WHEELS SUITABLE FOR USE ON A PORTABLE VEHICLE ADHESIVE REMOVER

This is a continuation of application Ser. No. 07/733,879, filed Jul. 22 1991, now U.S. Pat. No 5,624,990.

BACKGROUND OF THE INVENTION

1. Field of the Invention

The present invention relates to the field of manufacturing rubber products. More particularly the present invention relates to the field of manufacturing rubber wheels used for removing vehicle adhesives.

2. Description of the Prior Art

In automobile and other vehicle manufacture and service industries, people often need to remove pinstripes, decals, side moldings and other adhered items from the bodies of vehicles such as trucks or automobiles. Traditionally this is done by peeling, scratching or sanding off the pinstripes, decals, side moldings, etc. However, these traditional methods usually cause damage to the original paint of the bodies of the vehicles.

A new method of removing pinstripes, decals, side moldings and other adhered items from a vehicle utilizes a portable vehicle adhesive remover. Referring to FIG. 1, the portable vehicle adhesive remover 10 has a rubber wheel 12 driven by an air die grinder 14. When high pressure compressed air is sent into the air die grinder 14, it drives the rubber wheel 12 to rotate at a high speed. As the high speed rotating rubber wheel 12 is engaged to the pinstripes, decals, side moldings and other adhered items, it may generate heat to cause the adhesive to lose its adhesion and thus release the pinstripes, decals, side moldings and other adhered items, so the pinstripes, decals, side moldings and other adhered items can be removed without damaging the original paint on the vehicle.

A critical aspect of this new method of removing pinstripes, decals, side moldings and other adhered items from a vehicle is the hardness of the rubber wheel of the portable vehicle adhesive remover. On one hand, if the rubber wheel is too soft, it may not generate adequate heat, or take too long to generate adequate heat, as it is applied to pinstripes, decals, side moldings and other adhered items to cause the adhesive to lose adhesion. On the other hand, if the rubber wheel is too hard, it may leave permanent damage on the original paint of the vehicle. Unfortunately, there is no suitable product available on today's market which has the required critical feature to allow it to be used as the rubber wheel for the new portable vehicle adhesive remover.

It is desirable to manufacture rubber wheels used on the new portable vehicle adhesive remover for removing pinstripes, decals, side moldings and other adhered items from a vehicle, which rubber wheels are firm enough to effectively generate adequate heat when being applied to pinstripes, decals, side moldings and other adhered items to cause the adhesive to lose adhesion, yet soft enough so as not to damage the paint of the vehicle.

SUMMARY OF THE INVENTION

The present invention is a method of manufacturing rubber wheels used on a portable vehicle adhesive remover for removing pinstripes, decals, side moldings and other adhered items from a vehicle without damaging the original paint of the vehicle, and composition of the rubber wheels.

It is known that most of the pinstripes, decals and side moldings and many other functional or decorative items are adhered on the body of a vehicle. It is also known that at a certain temperature the adhesive retaining the item on the vehicle will lose its adhesion. It is further known that relative motions between two frictionally engaged objects may generate frictional heat on the two objects.

It has been discovered, according to the present invention, that if the rubber wheel of the portable vehicle adhesive remover is rotating at a speed within a range of between approximately 3,000 rpm to 4,000 rpm, then it may generate substantial heat when it is applied to the pinstripes, decals, side moldings and other items adhering to the body of a vehicle.

It has also been discovered, according to the present invention, that if a rubber wheel has a Shore A hardness of less than approximately 40, then it may be too soft to effectively generate adequate heat when it is rotating at a speed within the above-referenced range and applied to pinstripes, decals, side moldings and other items adhering to the body of a vehicle to cause the adhesive to lose adhesion so pinstripes, decals, side moldings and other adhered items may be removed without damaging the paint of the vehicle.

It has further been discovered, according to the present invention, that if a rubber wheel has a Shore A hardness of more than approximately 45, then it may be too hard and will damage the paint of a vehicle when the rubber wheel is rotating at a speed within the above-referenced range and applied to pinstripes, decals, side moldings and other items adhering to the vehicle.

It has also been discovered, according to the present invention, that if the rubber wheel is formed by a method which includes adding a substantial amount of inorganic filler into the masticated rubber mixture, where the parts ratio of the inorganic filler to the rubber is approximately 1:1, then the Shore A hardness of the rubber wheel can be substantially reduced to the range of 40 to 45.

It has further been discovered, according to the present invention, that if the rubber wheel is formed by the above-referenced method which further includes adding a proper amount of cross-linking agent into the masticated rubber mixture, where the parts percentage of the cross-linking agent is within the range of between approximately 0.5% and approximately 1%, then the elasticity of the rubber wheel can be properly adjusted.

It has additionally been discovered, according to the present invention, that if the rubber wheel is formed by the above-referenced method which additionally includes adding pumice into the masticated rubber mixture, then the abrasion resistance of the rubber wheel can be properly adjusted.

It is therefore an object of the present invention to provide a method of manufacturing rubber wheels and composition therefor used on a portable vehicle adhesive remover for removing pinstripes, decals, side moldings and other items adhering to a vehicle, where the rubber wheel of the portable vehicle adhesive remover is rotating at a speed within a range of between approximately 3,000 rpm and 4,000 rpm, so that it may generate substantial heat when it is applied to pinstripes, decals, side moldings and other items adhering to a vehicle.

It is also an object of the present invention to provide a method of manufacturing rubber wheels and composition therefor used on a portable vehicle adhesive remover for removing pinstripes, decals, side moldings and other items adhering to a vehicle, where the rubber wheel has a Shore A hardness of more than approximately 40, so that it may be hard enough to effectively generate adequate heat when it is rotating at a speed within the above-referenced range and applied to pinstripes, decals, side moldings and other adhered items of a vehicle to cause the adhesive to lose adhesion so pinstripes, decals, side moldings and other adhered items may be removed without damaging the paint of the vehicle.

It is a further object of the present invention to provide a method of manufacturing rubber wheels and composition therefor used on a portable vehicle adhesive remover for removing pinstripes, decals, side moldings and other items adhering to a vehicle, where the rubber wheel has a Shore A hardness of less than approximately 45, so that it may not be too hard to cause damage to the paint of a vehicle when the rubber wheel is rotating at a speed within the above-referenced range and applied to pinstripes, decals, side moldings and other items adhering to a vehicle.

It is also an object of the present invention to provide a method of manufacturing rubber wheels and composition therefor used on a portable vehicle adhesive remover for removing pinstripes, decals, side moldings and other items adhering to a vehicle, where the rubber wheel is formed by a method which includes adding a substantial amount of inorganic filler into the masticated rubber mixture, where the parts ratio of the inorganic filler to the rubber is approximately 1:1, so that the Shore A hardness of the rubber wheel can be substantially reduced to the range of 40 to 45.

It is a further object of the present invention to provide a method of manufacturing rubber wheels and composition therefor used on a portable vehicle adhesive remover for removing pinstripes, decals, side moldings and other items adhering to a vehicle, where the rubber wheel is formed by the above-referenced method which further includes adding a proper amount of cross-linking agent into the masticated rubber mixture, where the parts percentage of the cross-linking agent is within the range of between approximately 0.5% and approximately 1%, so that the elasticity of the rubber wheel can be properly adjusted.

It is an additional object of the present invention to provide a method product of manufacturing rubber wheels and composition therefor used on a portable vehicle adhesive remover for removing pinstripes, decals, side moldings and other items adhering to a vehicle, where the rubber wheel is formed by the above-referenced method which additionally includes adding pumice into the masticated rubber mixture, so that the abrasion resistance of the rubber wheel can be properly adjusted.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of the present invention rubber wheel used on a portable vehicle adhesive remover.

FIG. 2 is a perspective view of the present invention rubber wheel having a stem attached to an embedded disc for attachment with the portable vehicle adhesive remover.

FIG. 3 is a cross-sectional view taken along line 3—3 of FIG. 2.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 2 and FIG. 3, there is shown the present invention rubber wheel 12 having a stem 16 attached to an embedded disc 18 for attachment with the portable air die grinder 14. The rubber wheel 12 is made of natural or synthetic rubber or their mixture plus other admixtures. The relative amount of the rubber mixture and other admixtures are described in the designation of "parts" which has traditionally been used by the people in the industry. If, for example, a mixture has a total weight of 100 lbs. which includes 60 lbs. of a first substance and 40 lbs. of a second substance, then it may be said that the mixture is combined by 60 parts of the first substance and 40 parts of the second substance.

Initially, about 100 parts of rubber are masticated in a mixer. This 100 parts of rubber may contain only natural rubber, or only synthetic rubber, or both. The percentage by parts of the natural rubber may be, therefore, anywhere from 0% to 100%. Accordingly, the percentage by parts of the synthetic rubber may be anywhere from 100% to 0%. By way of example, in the preferred embodiment of the present invention, the percentage by parts of natural rubber is 25%, and the percentage by parts of synthetic rubber is 75%, which means that in 100 parts of rubber, there are 25 parts of natural rubber and 75 parts of synthetic rubber. It will be appreciated that other percentages may well be incorporated by the present invention. The synthetic rubber used in the present invention is Styrene Butadiene Rubber (SBR), the most common synthetic rubber. Of course other types of synthetic rubber may be used. In the following discussion, unless otherwise specified, the relative amounts of other admixtures are measured by their respective parts in respect to this 100 parts of rubber.

The rubber is masticated in the masticating mixer until it becomes a viscous rubber mixture having a desired viscosity and a temperature of about 175°–220° F. Various admixtures are then mixed into the viscous rubber mixture. First a stabilizing agent and an anti-sticking agent are mixed into the viscous rubber mixture. The stabilizing agent may be a fatty acid such as stearic acid. Mixing of the stabilizing agent is optional but preferred. For the 100 parts of rubber, about 2 parts of stearic acid may be added. The anti-sticking agent is added for aiding the flow of the rubber mixture and preventing it from sticking to the mixer, or further sticking to the mold. Again, mixing of the stabilizing agent is optional but preferred. About 3 parts of Di-Ethylene Glycol (DEG) may be added into the viscous rubber mixture as the anti-sticking agent. Then an appropriate amount of vulcanized oil and an activating agent are mixed into the viscous rubber mixture. The vulcanized oil is a vulcanized vegetable oil, and the maximum amount of the vulcanized vegetable oil may not exceed 250 parts. The preferred amount of the vulcanized vegetable oil is about 120 parts. For that amount of the vulcanized oil, at least 2 parts but not more than 7 parts of the activating agent may be added. The activating agent may be zinc oxide, and the preferred amount of zinc oxide is about 5 parts. After the vulcanized oil and the activating agent are mixed into the viscous rubber mixture, an appropriate amount of an inorganic filler and an appropriate processing oil are added. The inorganic filler is added to improve the friability of the final product rubber wheel. The amount of the inorganic filler may be at least 50 parts but not more than 150 parts. If the amount of the inorganic filler is not enough, then the final rubber wheel may not be friable enough; in other words, it may be too hard. Yet, if the amount of the inorganic filler is too much, then the final product rubber wheel may be too friable; in other words, it may not be hard enough. Two finely divided substances are used in the present invention as inorganic fillers, hard clay and calcium carbonate ($CaCO_3$). The total amount of the inorganic filler is about 100 parts, wherein 60 parts are hard clay and 40 parts are calcium carbonate ($CaCO_3$). The processing oil is used for improving the workability of the rubber mixture, and about 60 parts of the processing oil may be added.

As the above-described admixtures are mixed into the viscous rubber mixture, the temperature of the resulting rubber mixture is gradually reduced to about 100°–150° F. A cross-linking agent and an accelerating agent are now mixed into the cooled rubber mixture. The typical cross-linking agent is sulphur. The elasticity of the final rubber wheel is also controlled by the amount of sulphur added. If the sulphur content is too low, then the final rubber wheel may not be firm enough. Yet if the sulphur content is too high, then the final rubber wheel may not be soft enough. For the purpose of the present invention, the amount of sulphur may be controlled to be within the range of about 2–5 parts, or about 0.5–1.5% by parts of the total parts of the rubber mixture. In the preferred embodiment of the present invention, about 3.5 parts of sulphur are used for a total of about 400 parts of ingredients, which gives about 0.9% by parts of sulphur. The accelerating agent is used to speed up the vulcanization process and to improve the properties of the vulcanisates. About 2 parts of Mercapto Benthyl Thiaelolen Di-Sulfide (MBTS) and about 0.25 parts of Methyl Zimate are added as the accelerating agent.

It is understood that the sequence of mixing the admixtures in the above described synthesizing process is the sequence used in one of the preferred embodiment of the present invention method. Other sequences may well be followed. For example, sulphur and the accelerating agent may be added before the viscous rubber mixture is cooled down to about 100°–150° F. However, it is preferred that this whole mixing or synthesizing process is completed within about 10 minutes. It is also understood that various other optional substances may be mixed into the viscous rubber mixture for either improving the workability of the viscous rubber mixture or improving the property of the final product rubber wheel. For example, about 1.5 parts of an anti-oxidating agent may be added for delaying the aging of the final product rubber wheel due to the action of oxygen. Furthermore, an appropriate amount of pumice may be mixed into the rubber mixture to improve the abrasion resistance of the final product rubber wheel.

The resulting mixture of above-described synthesizing process is a rubber compound having a temperature of about 100°–150° F. which is ready to be injected into a vulcanization mold for producing the final rubber wheel. The mold has a disc shaped hollow chamber. The metal disc 18 is placed at the middle of the hollow chamber, such that when the rubber wheel 12 is formed, the metal disc 18 is embedded at the middle of the rubber wheel 12, and the metal stem 16 attached to the metal disc 18 extends out of the rubber wheel 12 for adapting with the air die grinder 14. The diameter and the thickness of the rubber wheel 12 are about 3 inches and ½ inch respectively. It is preferable to prime the embedded metal disc 18 with oil. After the rubber compound is injected into the vulcanization mold, air is excluded from the mold and the vulcanization process is carried on under an appropriate pressure at an appropriate temperature for an appropriate time period. In the preferred embodiment of the present invention, the pressure of the mold is kept at between about 2,000–5,000 psi, the temperature of the mold is kept at about 310° F., and the time period of molding is about 15 minutes.

Table I below lists the substances, the corresponding commercially available products used, and amounts of the substances used as counted by parts, for synthesizing the rubber compound of the present invention, as an example of the preferred embodiments of the present invention.

TABLE I

| EXAMPLE OF INGREDIENTS | | |
|---|---|---|
| INGREDIENTS | PRODUCTS | AMOUNTS |
| Natural Rubber | SMR-5 | 25 |
| Synthetic Rubber | SBR-1507 | 75 |
| Vulcanized Vegetable Oil | AMBEREX | 120 |
| Processing Oil | CYCOLUBE | 60 |
| Inorganic Filler (Hard Clay) | WHITAX CLAY | 60 |
| Inorganic Filler ($CaCO_3$) | WHITING | 40 |
| Stabilizing Agent | Stearic Acid | 2.0 |
| Processing Agent | DEG | 3.0 |
| Anti-oxidating Agent | STALITE-S | 1.5 |
| Activating Agent | Zinc Oxide | 5.0 |
| Cross-linking Agent | Sulphur | 3.5 |
| Accelerating Agent | MBTS | 2.0 |
| Accelerating Agent | Methyl Zimate | 0.25 |

The final composition is a rubber wheel having a Shore A hardness of about 42, which is suitable for use on a portable vehicle adhesive remover for removing pinstripes, decals, side moldings and other items which are adhered to a vehicle. The present invention rubber wheel is hard enough to effectively generate adequate heat when it is rotating at a speed within the above-referenced range and applied to pinstripes, decals, side moldings and other adhered items of a vehicle to cause the adhesive to lose adhesion so pinstripes, decals, side moldings and other adhered items may be removed without damaging the paint of the vehicle, yet not too hard to cause damage to the paint of the vehicle.

Defined in detail, the present invention is a method of manufacturing rubber wheels used on a portable vehicle adhesive remover for removing pinstripes, decals, side moldings and other items adhering to a vehicle, comprising:

(a) masticating approximately 100 parts of rubber in a mixer to produce a viscous rubber mixture having a temperature between approximately 170°–220° F.;

(b) synthesizing a rubber compound having a temperature between approximately 100°–150° F. by mixing into said rubber mixture: (i) stabilizing agent; (ii) less than 250 parts of vulcanized oil and at least 2 parts but not more than 7 parts of activating agent; (iii) at least 50 parts but not more than 150 parts of inorganic filler; (iv) less than 100 parts of processing oil; (v) at least 0.5% but not more than 1.5% by parts of cross-linking agent; and (vi) accelerating agent;

(c) placing a coupling member made of metal material inside a mold; and (d) vulcanizing said rubber compound in said mold at a temperature between approximately 300°–350° F. and under a pressure between approximately 2,000–5,000 psi for a time period between approximately 10–20 minutes, to produce a rubber wheel used on a portable vehicle adhesive remover for removing pinstripes, decals, side moldings and other items adhering to a vehicle.

Defined broadly, the present invention is a method of manufacturing rubber wheels used on a portable vehicle adhesive remover for removing pinstripes, decals, side moldings and other items adhering to a vehicle, comprising:

(a) masticating approximately 100 parts of rubber in a mixer to produce a hot viscous rubber mixture;

(b) synthesizing a warm rubber compound by mixing into said rubber mixture: (i) an appropriate amount of oil; (ii) at least 2 parts of activating agent; (iii) at least 50 parts but not more than 150 parts of inorganic filler; and (iv) at least 0.5% but not more than 1.5% by parts of cross-linking agent; and (c) vulcanizing said rubber compound in a heated pressure mold to produce a rubber wheel used on a portable vehicle adhesive remover for removing pinstripes, decals, side moldings and other items adhering to a vehicle.

Also defined in detail, the present invention is a rubber wheel manufactured by the method as defined above in detail having a Shore A hardness of approximately 42 for being used on a portable vehicle adhesive remover, which rubber wheel can effectively generate adequate heat, when rotating at a speed between approximately 3,000–4,000 rpm and applied to pinstripes, decals, side moldings and other adhered items of a vehicle, to cause the adhesive to lose adhesion, so that pinstripes, decals, side moldings and other adhered items can be removed without damaging the paint of the vehicle.

Also defined broadly, the present invention is a rubber wheel manufactured by the method as defined above broadly having a Shore A hardness between approximately 40–45 for being used on a portable vehicle adhesive remover, which rubber wheel can effectively generate adequate heat, when rotating at a high speed and applied to pinstripes, decals, side moldings and other adhered items of a vehicle, to cause the adhesive to lose adhesion, so that the pinstripes, decals, side moldings and other adhered items can be removed without damaging the paint of the vehicle.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A rubber wheel having 100 parts of rubber which contains
    (i) a stabilizing agent;
    (ii) less than 250 parts of vulcanized oil and at least 2 parts but not more than 7 parts of activating agent;
    (iii) at least 50 parts but not more than 150 parts of inorganic filler;
    (iv) less than 100 parts of processing oil;
    (v) at least 0.5% but not more that 1.5% by parts of cross-linking agent; and
    (vi) an accelerating agent, said rubber having a Shore A hardness of approximately 42.

2. A rubber wheel having 100 parts of rubber which contains
    (i) an appropriate amount of oil;
    (ii) at least 2 parts of activating agent;
    (iii) at least 50 parts but not more than 150 parts of inorganic filler;
    (iv) at least 0.5% but not more than 1.5% by parts of cross-linking agent; said rubber having a Shore A hardness between approximately 40–45.

3. An article of manufacture, comprising:
    (a) a metal stem having a cylindrical shape with a longitudinal axis and two ends;
    (b) a metal disc attached to one end of said metal stem, said disc having a major axis perpendicular to said longitudinal axis of said metal stem;
    (c) a rubber wheel surrounding said metal disc and having a major axis coplanar with the major axis of said metal disc, said rubber wheel comprising
        (i) 100 parts of a synthetic rubber,
        (ii) at least 0.5% but not more that 1.5% by parts of cross-linking agent; and
        (iii) an inorganic filler,
with the amounts of said crosslinking agent and said filler being effective to adjust a hardness of said rubber wheel to a Shore A hardness of approximately 40–45.

4. The article of manufacture of claim 3, wherein said synthetic rubber is a rubber selected from the group consisting of styrene butadiene rubber, polychloroprene rubber, acrylonitrile-butadiene rubber, ethylene-propylene rubber, polyacrylonitrile rubber, silicone rubber, epichlorohydrin rubber, and polyurethane rubber.

5. The article of manufacture of claim 4, wherein said synthetic rubber is styrene butadiene rubber.

6. The article of manufacture of claim 4, wherein said synthetic rubber is polychloroprene rubber.

7. The article of manufacture of claim 4, wherein said synthetic rubber is acrylonitrile-butadiene rubber.

8. The article of manufacture of claim 4, wherein said synthetic rubber is ethylene-propylene rubber.

9. The article of manufacture of claim 4, wherein said synthetic rubber is polyacrylonitrile rubber.

10. The article of manufacture of claim 4, wherein said synthetic rubber is silicone rubber.

11. The article of manufacture of claim 4, wherein said synthetic rubber is epichlorohydrin rubber.

12. The article of manufacture of claim 4, wherein said synthetic rubber is polyurethane rubber.

* * * * *